United States Patent [19]

Miyake et al.

[11] 4,216,034
[45] Aug. 5, 1980

[54] PROCESS FOR THE PRODUCTION OF A HARD SOLID SOLUTION

[75] Inventors: Masaya Miyake; Minol Nakano; Takaharu Yamamoto; Akio Hara, all of Itami, Japan

[73] Assignee: Sumitomo Electric Industries, Ltd., Osaka, Japan

[21] Appl. No.: 927,903

[22] Filed: Jul. 25, 1978

[30] Foreign Application Priority Data

| Jul. 27, 1977 | [JP] | Japan | 52-90618 |
| Sep. 13, 1977 | [JP] | Japan | 52-111005 |
| Nov. 29, 1977 | [JP] | Japan | 52-143176 |
| Dec. 29, 1977 | [JP] | Japan | 52-159300 |
| Apr. 28, 1978 | [JP] | Japan | 53-52050 |
| May 17, 1978 | [JP] | Japan | 53-59142 |

[51] Int. Cl.$^2$ ............................................. C22C 29/00
[52] U.S. Cl. .................................. 148/20.3; 75/240; 148/126
[58] Field of Search .................. 75/238, 230, 231, 176, 75/240; 106/43, 39.5, 44; 148/16.5, 16.6; 423/61, 440

[56] References Cited

U.S. PATENT DOCUMENTS

| 3,479,155 | 11/1969 | Rudy | 75/240 |
| 4,049,876 | 9/1977 | Yamamoto et al. | 75/241 |
| 4,066,451 | 1/1978 | Rudy | 75/241 |
| 4,101,318 | 7/1978 | Rudy | 75/241 |

*Primary Examiner*—M. J. Andrews
*Attorney, Agent, or Firm*—Wenderoth, Lind & Ponack

[57] ABSTRACT

This invention relates to a process for the production of a solid solution of compounds consisting of, in combination, at least 10 mol %, based on all metallic components, of molybdenum, at least one metallic element selected from the Group IVa, Va and VIa elements of the Periodic Table and at least one of non-metallic elements, which comprises mixing the metallic elements in the form of compounds or solutions thereof, adding carbon, optionally with at least one of non-metallic elements to the mixture, subjecting the resulting mixture to a reducing reaction with carbon and then subjecting to a solid solution-forming treatment in a reducing, carburizing or nitriding atmosphere.

15 Claims, 3 Drawing Figures

PROCESS FOR THE PRODUCTION OF A HARD SOLID SOLUTION

BACKGROUND OF THE INVENTION

1. Field of the Invention

The present invention relates to a process for the production of a mixed or composite carbide for a cemented carbide alloy, in particular, in which part of the tungsten carbide in the alloy is replaced by molybdenum carbide and more particularly, it is concerned with a process for the production of a mixed or composite carbide consisting mainly of molybdenum carbide and tungsten carbide in the form of a solid solution whose crystal structure is of a simple hexagonal type.

2. Description of the Prior Art

Up to the present time, as a starting material for cemented carbides, there has been used tungsten carbide (WC) powder as a predominant component with a suitable binder metal, typically an iron group metal, to which carbides or carbonitrides of high melting point metals such as titanium, tantalum, niobium, molybdenum, hafnium, vanadium and chromium are added depending on the requirements of a desired alloy. However, it is also true that tungsten is a relatively expensive metal and that it is found in only a few parts of the world. Accordingly, it is considered to be a so-called "strategic" material, and its availability can be subject to political considerations. Therefore, increase of the demand for cemented carbides consisting mainly of tungsten carbide meets inevitably with a problem of natural resources, and if the tungsten carbide can be exchanged for another high melting point metal carbide, this exchange has a great influence upon the industry.

Molybdenum monocarbide (MoC) is considered as a useful substitute, since this carbide only has the same crystal structure of simple hexagonal type as tungsten carbide, as well as mechanical properties similar to tungsten carbide. However, the existence of the hexagonal molybdenum monocarbide as a simple substance has remained in question to this date and thus an attempt to stabilize molybdenum has exclusively been carried out by forming a solid solution with tungsten carbide. This method was first reported by W. Dawihl in 1950, but this solid solution was not examined in detail and its commercial worth was not found in those days.

Of late, however, the study to utilize the solid solution $(Mo_xW_y)C$ where $x+y=1$ has become active with the rise of the price of tungsten. It is very interesting why a study on this solid solution and an attempt to use the same have not been carried out so actively.

In the prior art process for the production of a solid solution of MoC-WC, WC, Mo and C powders or W, Mo, C and Co powders are mixed, charged in a carbon vessel and reacted at a temperature of 1600° to 2000° C. (W. Dawihl; "Zeitschrift f. Anorganische Chemie" 262 (1950) 212). In this case, cobalt serves to aid in forming the carbide and to dissolve molybdenum and carbon in the tungsten carbide. In the absence of cobalt, it is very difficult to obtain a solid solution of (Mo, W)C. When a (Mo, W)C powder obtained by this method is used for the production of a cemented carbide alloy with a binder metal of Co as a substitute for WC, however, (Mo, W)C decomposes in the alloy to deposit needle crystals of $(Mo, W)_2C$. Deposition of even a small amount of such a subcarbide with aggregation in the alloy causes deterioration of the strength of the alloy. For this reason, the use of MoC as a substitute for WC has not been attempted positively.

SUMMARY OF THE INVENTION

It is an object of the present invention to provide a process for the production of a hard solid solution containing molybdenum and tungsten.

It is another object of the present invention to provide a process for the production of a mixed carbide of molybdenum and tungsten, whereby the disadvantages of the prior art method are overcome.

It is a further object of the present invention to provide a process for producing on a commercial scale a uniform solid solution of (Mo, W)C as a main component by a two stage reducing and carburizing method.

These objects can be attained by a process for the production of a solid solution of compounds consisting of, in combination, 10 mol % or more, based on all metallic elements, of molybdenum, one or more metallic elements selected from the Group IVa, Va and VIa elements of the Periodic Table and one or more non-metallic elements, which comprises mixing the metallic elements in the form of compounds or solutions thereof, adding carbon and optionally one or more non-metallic elements to the mixture, reducing the mixture with carbon, preferably in an inert atmosphere and then subjecting to a solid solution-forming treatment in a reducing, carburizing or nitriding atmosphere.

BRIEF DESCRIPTION OF THE DRAWING

The accompanying drawings illustrate the principle and merits of the present invention in more detail.

DETAILED DESCRIPTION OF THE INVENTION

Figure 1:
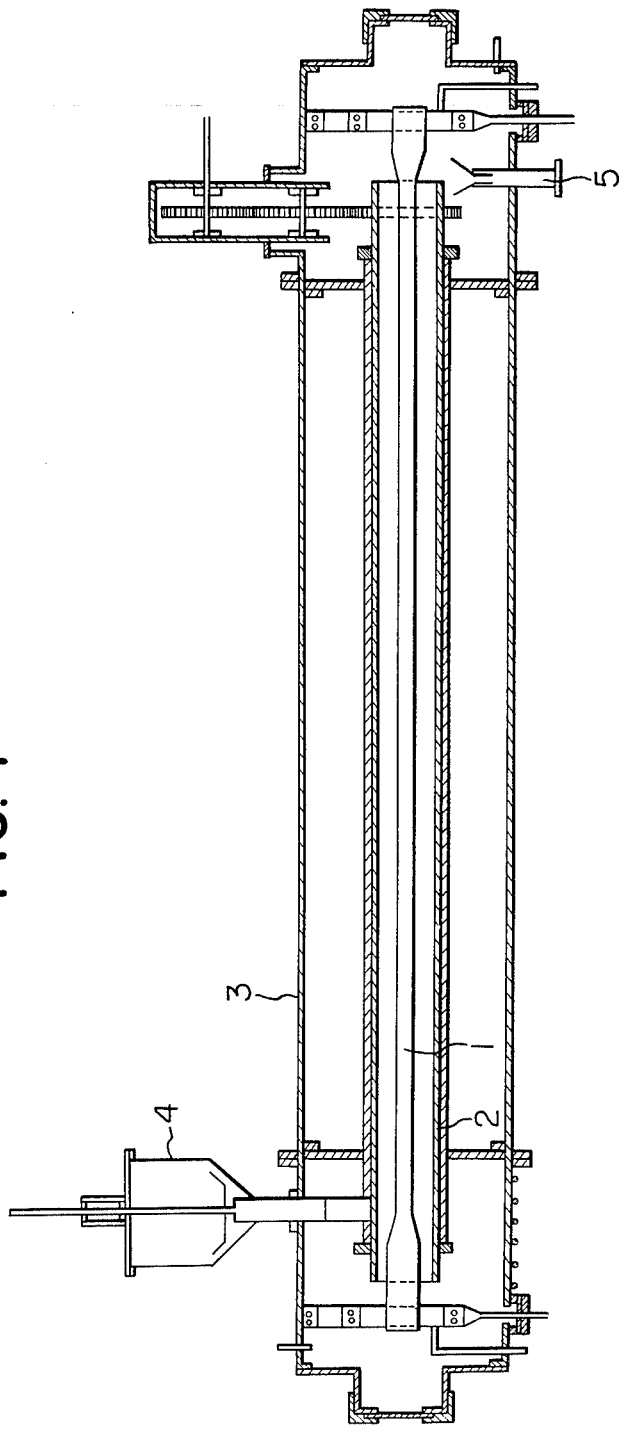
FIG. 1 shows schematically one example of an apparatus, a rotary furnace, for carburization suitable for the practice of the process according to the present invention, in cross section.

We, the inventors, have made studies on a process for producing a stable carbide of (Mo, W)C considering that if (Mo, W)C is stabilized in the alloy, this powder can favourably be used as a substitute for WC and, consequently, have reached the following invention.

That is to say, the present invention provides a process for the production of a solid solution of compounds consisting of, in combination, 10 mol % or more, based on all metallic components, of molybdenum, at least one metallic component selected from the Group IVa, Va and VIa elements of the Periodic Table and at least one non-metallic element, which comprises mixing the metallic elements in the form of compounds or solution thereof, adding carbon and optionally at least one non-metallic element to the mixture, reducing the mixture with carbon, preferably in an inert atmosphere and then subjecting to a solid solution-forming treatment in a reducing, carburizing or nitriding atmosphere.

The hard solid solution obtained by this process is represented by the following general formula:

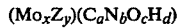

$(Mo_xZ_y)(C_aN_bO_cH_d)$

In this formula, Z represents at least one element of titanium, zirconium, hafnium, vanadium, niobium, tantalum, chromium and tungsten selected from the Group IVa, Va and VIa of the Periodic Table, and a combination of molybdenum and tungsten is particularly preferable. The x and y are suitable numbers satisfying the relation of $x+y=1$, and a, b, c and d are suitable numbers satisfying the relation of $a+b+c+d \leqq 1$, the sum being preferably near 1. In a preferred embodiment, the above described solid solution is of a crystal structure of simple hexagonal WC type and has a composition of material which comprises molybdenum and tungsten, the proportion of molybdenum being at least 10 mol % based on metallic elements, with 0 to 40 mol % based on metallic elements of the Group IVa, Va and VIa elements and non-metallic elements consisting mainly of C and N.

In this process, one or more non-metallic elements can be used with carbon, such as hydrogen, nitrogen, oxygen, sulfur, phosphorus, fluorine, chlorine, bromine, arsenic, selenium, boron, silicon and the like. As the compound of the metallic element, there are used oxygen-containing compounds such as oxides and hydroxides, salts such as chlorides, sulfates and nitrates, metallic acids and their salts. These compounds can be mixed as such or in such a manner that at least one compound is in the form of a solution.

A preferred process of the present invention comprises mixing uniformly tungsten oxide or hydroxide and molybdenum oxide or hydroxide by a chemical or mechanical method in such a manner that the oxide or hydroxide particles be in a size of 0.2 micron or less, adding carbon in an amount required for the reduction and carbide formation to the mixed powder, granulating the mixture, subjecting the mixed and granulated powder to a primary reaction with agitation in a furnace heated at 800° C. or more, preferably in an inert atmosphere, and then subjecting the primary reaction product to a secondary reaction in a furnace heated at 1300° C. or more in a hydrogen or reducing atmosphere.

In order to prepare a solid solution of (Mo, W)C, in general, a step of heating at a temperature of 1600° C. or more is required, by which diffusion is caused among metal or carbide particles of molybdenum or tungsten to give a uniform solid solution. However, a heating step at a higher temperature, as shown Table 1, for a longer time, will be required for the diffusion and solid solution formation of metallic powders of molybdenum and tungsten with a particle size of several microns.

Table 1

| Heating Temperature (°C.) | Diffusion Coefficient (Single Crystal)(cm²/sec) | Particle Diameter Forming Solid Solution (μ) |
|---|---|---|
| 1600 | $7.6 \times 10^{-15}$ | 0.05 |
| 1800 | $1.2 \times 10^{-13}$ | 0.2 |
| 2000 | $1.1 \times 10^{-12}$ | 0.6 |
| 2200 | $5.4 \times 10^{-11}$ | 4.4 |

If the powder particles are very fine, the diffusion can readily be effected and an iron group metal is not required as a diffusion aid, so that it is possible to obtain a carbide with a good quality. However, it is considerably difficult on a commercial scale to obtain metallic powders and carbide powders of 0.5 micron or less in diameter.

The inventors have found that if molybdenum and tungsten are mixed in the form of ammonium salts of molybdenum and tungsten (ammonium tungstate, ammonium molybdate) or solutions thereof or in the form of oxides or halides of molybdenum and tungsten, their mixing proceeds well so that a uniform solid solution can readily be obtained even at a relatively lower heating temperature, as compared with the case of mixing metallic powders and/or carbide powders. When molybdenum and tungsten are evenly mixed in a step of forming oxides thereof and reduced with hydrogen, for example, a solid solution of (Mo, W) is obtained after the reduction. It is the most convenient method on a commercial scale to react this metallic powder with carbon to form a solid solution of carbide, but molybdenum oxide is hard to be reduced under the same condition as that of tungsten oxide due to its higher volatility. If molybdenum is evaporated or firstly reduced, it is feared that the molybdenum and tungsten, mixed in particle sizes on the order of microns in the former step, will be separated. Therefore, two or more reducing operations are necessary depending upon the reducing conditions, resulting in a problem that the productivity is not increased, and, moreover, reconstruction of the furnace is necessary.

Thus, the inventors have reached the conclusion that a high volatility oxide such as $MoO_3$ should be reduced with a strong reducing agent such as carbon rather than with hydrogen.

The important feature of the present invention consists in reducing a finely mixed oxide containing molybdenum with a reducing agent such as carbon or, in addition, other nonmetallic elements, to remove the oxygen contained therein in an inert atmosphere and then subjecting the product further to secondary heating in a reducing, carburizing or carbonitriding atmosphere to thus obtain a solid solution as an object product.

For the practice of the present invention on a commercial scale, firstly, it is important to finely mix tungsten oxide and molybdenum oxide. Hydroxides of tungsten and molybdenum ($H_2WO_4$, $H_2MoO_4$) are coprecipitated from a solution of ammonium salts thereof and the coprecipitated mixture is fired to obtain oxides mixed on the order of 0.1 micron, from which a solid solution can readily be prepared by carburization at a low temperature. In the case of mixing two oxides mechanically only, however, a carburization temperature of 1800° C. or more is required as shown in Table 1 if the particle size of the oxides is 0.2 micron or more. A carburization temperature of 1800° C. or more is not desirable because (Mo, W)C is unstable at such a high temperature. Therefore, it is commercially important that the particle size of the oxides is 0.2 micron or less.

The second important point is that the reducing reactions of molybdenum oxide and tungsten oxide start simultaneously, so it is necessary to effect the reduction by the reaction of the oxides with carbon only and it is not desirable to use hydrogen as an ambient gas since the reaction initiation points differ.

The second feature of the present invention consists in reacting rapidly $WO_3$ and $MoO_3$ at a high temperature such as 800° C. or higher without using a reducing atmosphere such as hydrogen and without a heating step at a low temperature. Since the carbon reduction of an oxide is carried out through a medium of CO gas generated in the powder bed, the reaction temperature is at least the activation temperature of carbon, i.e., 800° C. or higher. When molybdenum oxide and tungsten oxide are charged directly in such a high temperature zone, the reducing reaction proceeds rapidly and the resulting carbide is a uniform solid solution. In the process of the present invention, large amounts of CO and $CO_2$ gases are generated. In order to effect this reaction uniformly, it is desired to granulate the mixed powder and to control the partial pressure of CO and $CO_2$ gases in the powder bed by heating with rotation or by heating with agitation. By this method, a solid solution with a better quality can be obtained. A rotary furnace for carburization (U.S. Pat. No. 3,802,847) which the inventors have devised is most suitable for the practice of this method on a commercial scale. FIG. 1 shows a rotary furnace of this type, in which 1 is a heating element, 2 is a rotary cylinder, 3 is a casing, 4 is a hopper and 5 is a discharge port.

As a result of our studies, it is found that, when the primary carburization product, resulting from the reaction at a temperature of 800° C. or more, preferably 1000° to 2000° C., in an inert atmosphere, is reheated at a temperature of 1300° C. or more, preferably 1400° to 2000° C., in a hydrogen atmosphere, carbon is combined well and a complete solid solution is formed.

Preferably, the reaction at a temperature of 800° C. or more in the inert atmosphere is carried out to reduce the oxygen content to at most 1%.

The further feature of the present invention consists in completing the reduction without evaporating volatile molybdenum oxide. Therefore, the present invention can be adapted to solid solutions of carbides or carbonitrides containing molybdenum, which further contain one or more of titanium, zirconium, hafnium, vanadium, niobium, tantalum, chromium and tungsten selected form the Group IVa, Va and VIa elements of the Periodic Table.

In one embodiment of the present invention, mixing of the metallic elements can be carried out by mixing any compounds of different types or solutions thereof, for example, by mixing molybdenum oxide and tungsten hydroxide, molybdenum hydroxide and tungsten oxide, molybdenum chloride and tungsten oxide, molybdenum oxide and tungsten chloride, ammonium molybdate and tungsten oxide, ammonium tungstate and molybdenum oxide and so on. These compounds can optionally be used in the form of solutions if any.

In another embodiment of the present invention, a particle growth promoter such as sodium and potassium is added, for example, before the reduction of a molybdenum compound and tungsten compound such as $MO_3$ and $WO_3$ or before the carburization of the reduced (MO, W) powder, and the particle growth is thus promoted during the reducing reaction or carburizing reaction. In the reducing reaction of molybdenum and tungsten, the two elements are mixed and, consequently, the particle growth is hard. The powder obtained in the general reducing reaction or carburizing reaction is a fine powder having a particle size of about 1 micron in spite of the fact that a particle size of 2 to 5 microns is most suitable for a starting material of cemented carbides. Therefore, an effective particle growth promoter has been desired and to this end, the inventors have made efforts to find an element capable of aiding the reaction and thus promoting the particle growth. Thus it is found that sodium and potassium are reacted with molybdenum and tungsten to cause an active particle growth promoting effect. The additive quantity of sodium and potassium is preferably 100 to 5000 ppm since if less than 100 ppm, such an effect cannot be given, while if more than 5000 ppm, there are formed compounds of (Mo, W) powder with sodium and potassium, which have bad influences. Addition of sodium and/or potassium is generally carried out in the form of their compounds such as sodium carbonate, potassium carbonate and the like or in the form of a vapor to be added to a gas flow in a furnace.

In a further embodiment of the present invention, a particle growth retarder such as titanium, vanadium and chromium is added before or after the reducing reaction. To illustrate by way of example, titanium, vanadium and/or chromium in the form of oxides are allowed to coexist in the mixture so as to prevent the unevenness due to the difference in degree of reduction between molybdenum and tungsten and to retard the particle growth, whereby formation of the solid solution of molybdenum and tungsten can well be completed. The carbide obtained in this way is uniform and suitable for use as a starting material for cemented carbides. Most preferably, such a particle retarder is added before the reducing reaction to control the particle size of the reduced powder and to form a uniform solid solution, but even if added after the reduction, retarding of the particle growth is effected in the carburizing reaction. The additive quantity of the particle growth retarder such as titanium, vanadium and chromium is preferably 0.05 to 3% by weight under the condition to form the hexagonal monocarbide of (Mo, W)C, since if less than 0.05% by weight, such an effect cannot be expected, while if more than 3% by weight, it is difficult to prepare (Mo, W)C in a stable manner.

In a still further embodiment of the present invention, a carburization reaction retarder such as sulfur or compounds thereof is added before or after the reducing reaction. During the reducing or carburizing reaction, sulfur vapor is sublimated to retard the reducing reaction of $WO_3$ and $MoO_3$. Consequently, the reaction of forming the solid solution of W and Mo is carried out simultaneously with the reducing reaction and, even during the carburizing reaction, the reaction of forming the solid solution of W and Mo is also promoted. The solid solution obtained in this way is of coarse particles having a uniform particle size distribution.

For the purpose of solving a problem of natural resources of tungsten, it is desirable to replace tungsten carbide by another compound having a crystal structure of WC type, preferably, by a solid solution having a crystal structure of a simple hexagonal WC type and containing a carbide solid solution of molybdenum and tungsten (Mo, W)C as a main component, to which a compound of Mo(C, N, O) is added. In this respect, the solid solution capable of accomplishing the object of the present invention should be a hard solid solution or compound consisting mainly of a solid solution (Mo, W)C containing at least 10 mol % of molybdenum for saving tungsten, at most 40 mol % of one or more elements selected from the Group IVa, Va and VIa elements for keeping the crystal structure of WC type, and non-metallic elements such as carbon and nitrogen. Other non-metallic elements such as oxygen, boron and silicon can be incorporated therein. The amounts of the elements contained in the solid solution, for example, nitrogen, oxygen, hydrogen, etc. can be controlled by controlling the composition of a starting material or the atmosphere in a furnace, whereby the property of the solid solution is varied.

For example, the stability of the (Mo, W)C powder can be increased by carrying out the final heating step in an inert atmosphere or in a carbon monoxide atmosphere. That is to say, the reaction is carried out in nitrogen gas, carbon monoxide gas or a mixed gas of carbon monoxide and carbon dioxide to prevent decomposition of the carbide and, as occasion demands, iron, nickel and cobalt are used as a diffusion aid. In particular, iron can be added in the form of $Fe_3C$ to supply carbon. The amount of iron, nickel or cobalt contained in the mixed powder is preferably 0.5% or less, since if more than 0.5%, the powder is sintered and alloyed and recovery in the form of powder is difficult. In the case of using cobalt or nickel of the iron group metals, supply of carbon is not carried out so actively and it should be added in an amount of about 1%, since the stabilizing effect of the carbide is small. The heating temperature is preferably 1200° C. or more and heating at a temperature of 2000° C. or higher is not desirable, which results in an unstable (Mo, W)C.

In the process of the present invention, the stability of the hexagonal monocarbide solid solution can be raised by heating the mixed powder at a temperature of 1400° C. or higher, then cooling once to room temperature to give a strain to the primary reaction product and reheating at a temperature of 1000° to 1800° C. The feature of this treatment consists in converting molybdenum carbide into the form of a simple hexagonal type crystalline structure of WC type by a method wherein, since a carbide consisting mainly of MoC is not stable at room temperature, at least one other carbide such as WC is dissolved therein at a high temperature, the solid solution is cooled to normal temperature, subjected to a mechanical or thermal treatment to give a strain thereto and reheated at a temperature at which MoC is stable. In processes for the production of mixed carbides, in general, carbides are heated with each other, optionally using a diffusion aid such as cobalt, to give a uniform solid solution in most cases, but in the case of a composition of solid solution containing at least 70% of MoC, a uniform solid solution cannot be obtained by counter diffusion only at a high temperature. This is due to the fact that MoC is unstable at a high temperature and decomposed into solid solutions such as (Mo, W)$C_{1-x}$ and (Mo, W)$_3C_2$ and, consequently, the WC type solid solution of (Mo, W)C cannot be obtained by cooling as it is. As a method of stabilizing this carbide, it has been proposed to react them once at a high temperature, to effect diffusion of $Mo_2C$ and WC, and to hold at a low temperature for a long time (Japanese Patent Application (OPI) No. 146306/1976). However, a considerably long diffusion time and long recrystallization time are required for forming (Mo, W)C from (Mo, W)$C_{1-x}$ and (Mo, W)$_3C_2$ at a low temperature. For the practice of this method on a commercial scale, the mixture should be heated for a long time in a furnace to obtain a complete carbide. This means that the productivity per one furnace is lowered and a number of furnaces are thus required. When using a continuous furnace, on the other hand, a long furnace is necessary and the mass production is difficult industrially.

The treatment of the present invention comprises providing a mixture of a mixed carbide of (Mo, W)$_2$C+C with carbon by the diffusion reaction of molybdenum and tungsten, then cooling the mixture rapidly to room temperature to obtain a primary carbide as unreacted at a high temperature with retaining several percents of carbon in the powder bed, subjecting the primary carbide to a mechanical grinder and finally reheating in a short time at a temperature at which (Mo, W)C is stable, thereby converting completely into a complete monocarbide (Mo, W)C powder. When this mechanical grinding is troublesome, the rapid cooling speed is increased using a continuous furnace to cause a rapid shrinkage of the reaction product and to strain the reaction product, and the reaction product is reheated to promote the solid solution-forming reaction.

According to this treatment, a large quantity of the mixed powder can be treated by the combination of continuous furnaces, and provision of a simple impact means on the way always results in a stable carbide. Where the primary reaction product has an uneven portion, a stable carbide cannot be obtained even if the heating conditions are changed. In the process of the invention, the evenness of the reaction product is increased and the secondary heating causes the reaction to proceed well. This heat treatment is best carried out where the quantity of MoC exceeds 70% and the MoC is lacking in stability.

The following examples are given in order to illustrate the present invention in detail without limiting the same, in which % is to be taken as that by weight unless otherwise indicated.

EXAMPLE 1

Ammoniacal solutions of molybdenum and tungsten were mixed in a molybdenum to tungsten ratio of 70 mol % to 30 mol %, to which hydrochloric acid was added to precipitate hydroxides of molybdenum and tungsten (particle size: 0.5µ). The resulting precipitate was fired at 300° C. in the air to form an oxide consisting of $(Mo_{0.7}W_{0.3})O_3$. 1 mol of the oxide was adequately mixed with carbon powder, kneaded with water and granulated. The granular powder obtained in this way was charged in a rotary furnace for carburization as shown in FIG. 1, heated at 1200° C. in a nitrogen stream.

Figure 2:
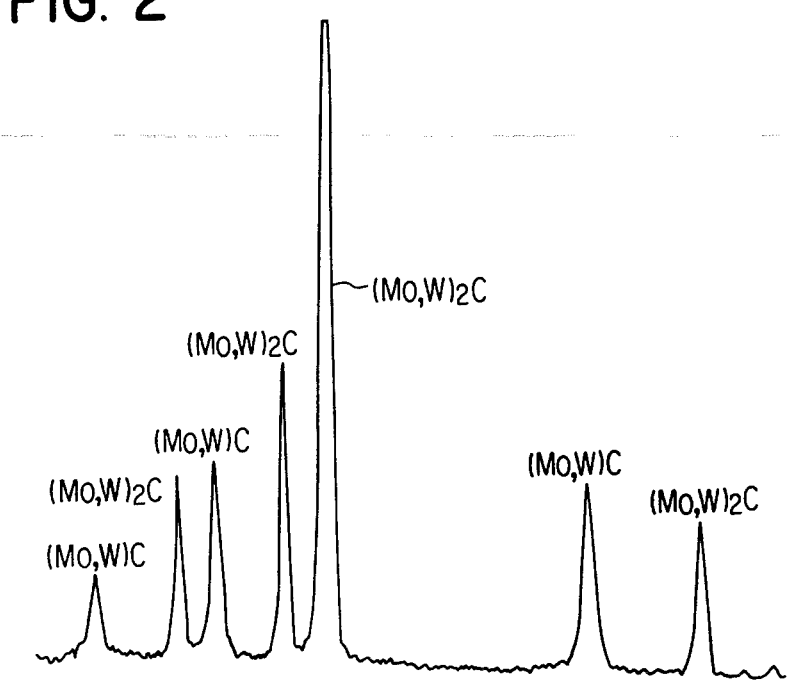
FIG. 2 and FIG. 3 show respectively X-ray diffraction diagrams of mixed carbides obtained by the process of the present invention, FIG. 2 being in the case of reacting at 1200° C. in an inert atmosphere and FIG. 3 being in the case of further heating the product of FIG. 2 at 1500° C. for 15 minutes in a hydrogen atmosphere.

Analysis of the resulting carbide using X-ray (CuK$_\alpha$, 30 KV, 15 mA) showed that there were two peaks of (Mo, W)$_2$C and (Mo, W)C as shown in FIG. 2. This is due to the fact that since the reaction is carried out at 1200° C. in an inert atmosphere, the combined carbon lacking. Therefore, it is assumed that a uniform solid solution, i.e., monocarbide is readily formed if the secondary reaction is carried out in a carburizing atmosphere. Thus, a reheating treatment was carried out as follows.

Figure 3:
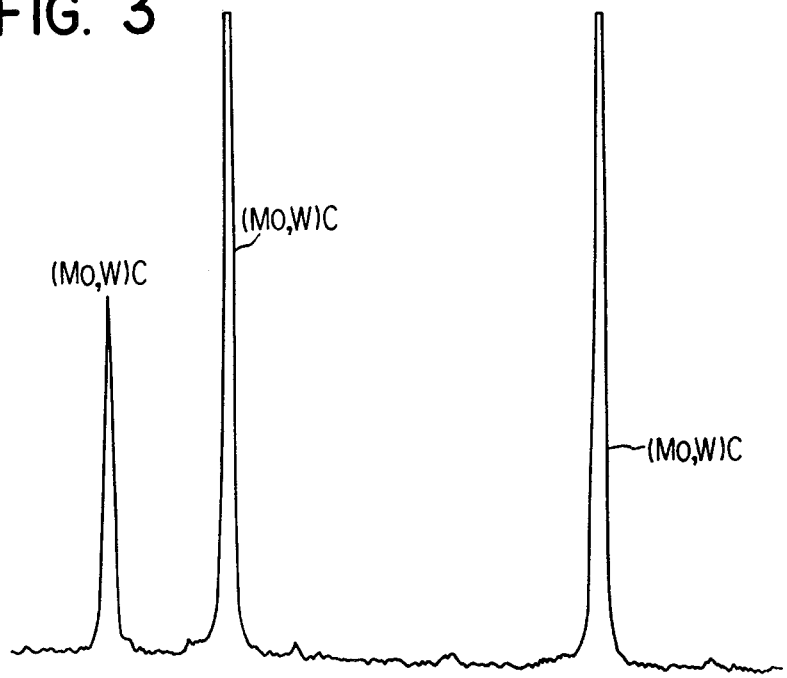

The primary carburized product or carbide was heated at 1500° C. for 15 minutes in a hydrogen stream to give a product having substantially a crystalline structure of (Mo, W)C as shown in FIG. 3 but showing no peak of (Mo, W)$_2$C.

Analytic results of the carbide are tabulated below:

Table 2

| | Amounts of Carbon and Gases in Carbide | | | | | |
|---|---|---|---|---|---|---|
| | T.C.* | F.C.** | C.C.*** | $O_2$ | $N_2$ | $H_2$ |
| After Carburization at 1500 °C. in $H_2$ | 8.89% | 0.02% | 8.87% | 0.01% | 0.10% | 0.002% |

*Total Carbon,
** Free Carbon,
***Combined Carbon

According to the process of the present invention, it is found that a sufficiently uniform solid solution of $(Mo_{0.7}W_{0.3})C$ can be obtained at 1500° C. in hydrogen. W. Dawihl has required a temperature of 1600° C. or higher and the presence of cobalt, while the present invention can give a uniform solid solution at a temperature of lower than 1600° C. A method of stabilizing (Mo, W)C has also been proposed which comprises reacting at a high temperature such as 1700° C. and 2000° C. to effect diffusion of WC and Mo₂C, and keeping at a low temperature for a long time, but, in the process of the present invention, such troublesome operations are not required.

EXAMPLE 2

51 g of $WO_3$ powder of 0.5 micron and 41 g of $MoO_3$ powder of 0.6 micron were mixed to prepare a (Mo, W)C powder with a Mo to W molar ratio of 7:3. This mixing was carried out respectively by the following procedures:

(A) Mixing by V-type mixer, 30 minutes
(B) Mixing by dry process ball mill, 10 hours
(C) Mixing by wet process ball mill (solvent:water), 30 hours The particle sizes of the oxides are shown in Table 3:

Table 3

| Mixing Method | Particle Size of Oxide |
|---|---|
| (A) | 0.5 μ |
| (B) | 0.2 μ |
| (C) | 0.1 μ |

Each of the above described oxides was mixed with carbon in a proportion of 3.5 mols of carbon to 1 mol of the oxide, formed into pellets with an extruded diameter of 1 mm, reacted in a rotary furnace for carburization maintained at 1200° C. in a nitrogen atmosphere and finally charged in a rotary furnace for carburization maintained at 1700° C. in a hydrogen stream, thus obtaining a carbide having the following analytical data:

Table 4

| Mixing Method | T.C. | F.C. | C.C. | X-ray Diffraction |
|---|---|---|---|---|
| (A) | 8.95 | 3.20 | 5.25 | (Mo, W)₂C, (Mo, W)C |
| (B) | 8.87 | 0.13 | 8.74 | (Mo, W)C |
| (C) | 8.90 | 0.03 | 8.87 | (Mo, W)C |

As can be seen from this table, in the method (A), carbon was not combined completely and both the peaks of (Mo, W)₂C and (Mo, W)C were detected, while in the mixing methods (B) and (C) using a particle size of oxide of 0.2 micron or less, all the oxides were converted into (Mo, W)C completely, which was found to be a complete monocarbide.

EXAMPLE 3

Molybdenum oxide and titanium oxide were mixed with a molybdenum to titanium molar ratio of 8:2, mixed with carbon in a proportion of 3.2 mols of carbon to 1 mol of the mixed powder so as to reduce the oxides and to give a desired carbon content, kneaded with water and then formed into pellets. The pelletized powder was then charged in a rotary furnace for carburization as shown in FIG. 1, heated at 1300° C. in a nitrogen stream for about 10 minutes and further heated at 1800° C. in a hydrogen stream, thus obtaining a uniform solid solution having a composition of $(Mo_{0.8}Ti_{0.2})(C_{0.85}N_{0.15})$.

On the other hand, the mixed powder was subjected to carburization at 1200° C. in a hydrogen stream using a Tammann furnace. At that time, vaporization of molybdenum occurred, the water formed by the reducing reaction with hydrogen reacted with the carbon to cause a marked decarburization and reduction of the titanium oxide did not proceed well to retain a large amount of oxygen. When the reduction and carburization were carried out at 1800° C. in a hydrogen stream, the oxygen content was decreased to 0.1% or less and the solid solution formation proceeded well, but there was a marked decrease of molybdenum and the desired composition was not obtained.

The solid solution obtained by the process of the present invention was a complete and uniform solid solution having the following analytic composition:

Table 5

| Composition of Carbide | | | | | |
|---|---|---|---|---|---|
| T.C. | F.C. | C.C. | O₂ | N₂ | H |
| 12.3% | 0.1% | 10.1% | 0.1% | 2.0% | 0.01% |

It is apparent from the foregoing results that, according to the process of the present invention, a uniform solid solution can readily be formed from molybdenum oxide, which is highly volatile and liable to be reduced at a low temperature, and titanium oxide which is hard to be reduced.

EXAMPLE 4

Ammoniacal solutions of molybdenum and tungsten were mixed with a molybdenum to tungsten ratio of 70 mol % to 30 mol %, to which hydrochloric acid was added to precipitate hydroxides of molybdenum and tungsten. The resulting precipitate was washed with water, filtered and then fired at 300° C. in the air to form an oxide consisting of $(Mo_{0.7}W_{0.3})O_3$. The oxides were adequately mixed with carbon in a proportion of 3.5 mols to 1 mol of the oxides, kneaded with 1500 ppm of sodium carbonate and water and formed into pellets. The pelletized powder obtained in this way was charged in a rotary furnace for carburization heated at 1300° C. in a nitrogen stream and at 1800° C. in a hydrogen stream and then subjected to a solid solution forming treatment at 1200° C. in a nitrogen atmosphere. The resulting carbide was a complete solid solution of hexagonal monocarbide which had been completely reacted at the low temperature and grown to a particle size of 6 microns. Analytical data are tabulated below:

Table 6

| | Amounts of Carbon and Gases in Carbide | | | | | | |
|---|---|---|---|---|---|---|---|
| | T.C. | F.C. | C.C. | O₂ | N₂ | H₂ | Na |
| After Heat Treatment at 1200° C. in N₂ | 8.89% | 0.02% | 8.87% | 0.01% | 0.10% | 0.002% | 50 ppm |

The content of Na was decreased to 50 ppm as shown in Table 6.

EXAMPLE 5

The procedure of Example 4 was repeated except adding 1% by weight of titanium dioxide to the precipitate in place of the sodium carbonate. The resulting carbide was a complete solid solution of hexagonal monocarbide which had been completely reacted at the low temperature and which has analytic values as shown in Table 7:

Table 7

| | Amounts of Carbon and Gases in Carbide | | | | | |
|---|---|---|---|---|---|---|
| | T.C. | F.C. | C.C. | $O_2$ | $N_2$ | $H_2$ |
| After Heat Treatment at 1200° C. in $N_2$ | 8.93% | 0.02% | 8.91% | 0.01% | 0.10% | 0.002% |

EXAMPLE 6

The procedure of Example 4 was repeated except adding 3% by volume of hydrogen sulfide gas to the nitrogen gas in the first heating step in place of the sodium carbonate. The resulting carbide was a complete solid solution of hexagonal monocarbide which had been completely reacted at the low temperature and which has an analytical composition as shown in Table 8:

Table 8

| | Amounts of Carbon and Gases in Carbide | | | | | |
|---|---|---|---|---|---|---|
| | T.C | F.C. | C.C | $O_2$ | $N_2$ | $H_2$ |
| After Heat Treatment at 1200° C. in $N_2$ | 8.89% | 0.02% | 8.87% | 0.01% | 0.10% | 0.002% |

EXAMPLE 7

Slurries of $H_2WO_4$ and $H_2MoO_4$ were adequately mixed with agitation in a tank with a molybdenum to tungsten molar ratio of 7:3, dried sufficiently and fired at 500° C. to give $(Mo_{0.7}W_{0.3})C$ powder. 80 parts of this mixture was ball milled adequately with 18.4 parts of carbon powder and 1.6 parts of chromium oxide powder, formed into pellets and then reacted in a rotary furnace for carburization under heating conditions of 1400° C. in a nitrogen stream and 1800° C. in a hydrogen stream. The product was further subjected to a solid solution-forming treatment at 1300° C. in a nitrogen stream to obtain a carbide with a crystalline structure of a simple hexagonal type. The analytical value of the resulting carbide are tabulated below:

Table 9

| Amounts of Carbon and Gases in Carbide | | | | | |
|---|---|---|---|---|---|
| T.C. | F.C | C.C | $O_2$ | $N_2$ | $H_2$ |
| 8.53% | 0.12% | 8.46% | 0.1% | 0.3% | 0.05% |

The carbide having a particle size of about 1 micron is suitable for use as a starting material for cemented carbides.

What is claimed is:

1. A process for the production of a solid solution containing tungsten, molybdenum, the proportion of molybdenum being at least 10 mol % based on metallic components in the solid solution, and at least one non-metallic element selected from the group consisting of carbon and nitrogen, said solid solution having a crystalline structure of a simple hexagonal WC type, which process comprises mixing molybdenum and tungsten in the form of compounds selected from the group consisting of oxides, hydroxides, chlorides, sulfates, nitrates, metallic acids and salts thereof, adding carbon, and optionally at least one member selected from the group consisting of hydrogen, nitrogen, oxygen, sulfur, phosphorus, fluorine, chlorine, bromine, arsenic, selenium, boron and silicon, to the mixture, subjecting the resulting mixture to a reducing reaction with the carbon, and then subjecting the thus obtained mixture to a solid solution-forming treatment in an atmosphere selected from the group consisting of reducing, carburizing and nitriding atmospheres.

2. The process as claimed in claim 1, wherein the mixture to be subjected to the reducing reaction with carbon further contains up to 40 mol %, in total, of at least one member selected from the group consisting of titanium, zirconium, hafnium, vanadium, niobium, tantalum and chromium.

3. The process as claimed in claim 1, wherein at least one particle growth promoter selected from the group consisting of sodium and potassium is added to the mixture before or after said mixture is subjected to the reducing reaction with carbon.

4. The process as claimed in claim 1, wherein at least one particle growth retarder selected from the group consisting of titanium, vanadium and chromium is added to the mixture before or after said mixture is subjected to the reducing reaction with carbon.

5. The process as claimed in claim 1, wherein at least one carburization reaction retarder selected from the group consisting of sulfur and a sulfur compound is added to the mixture before or after said mixture is subjected to the reducing reaction with carbon.

6. The process as claimed in claim 1, wherein at least one of the compounds of molybdenum and tungsten is used in the form of a solution.

7. The process as claimed in claim 1, wherein a mixed powder containing the molybdenum and tungsten oxides or hydroxides and carbon is granulated and then subjected to the reducing reaction with carbon while rotating or stirring the mixed powder.

8. The process as claimed in claim 1, wherein the mixture is subjected to the reducing reaction with carbon at a temperature of at least 800° C. in an inert atmosphere to reduce the oxygen content to at most 1%, and then subjected to the solid solution-forming treatment at a temperature of at least 1300° C. in a hydrogen atmosphere.

9. The process as claimed in claim 1, wherein tungsten oxide or hydroxide and molybdenum oxide or hydroxide are uniformly mixed by a chemical or mechanical method in such a manner that the oxide or hydroxide particles be in a size of 0.2 micron or less, carbon in an amount required for the reduction and carbide formation is added to the mixed powder, the resulting mixture is granulated, the granulated powder is then subjected to the reducing reaction with carbon under agitation in a furnace heated at a temperature of at least 800° C., and then subjected to the solid solution-forming treatment in a reducing atmosphere in a furnace heated at a temperature of at least 1300° C.

10. The process as claimed in claim 1, wherein the mixture to be subjected to the reducing reaction with carbon has a particle size of at most 1 micron.

11. The process as claimed in claim 1, wherein molybdenum oxide and tungsten oxide are mixed.

12. The process as claimed in claim 1, wherein ammoniacal solutions of molybdenum and tungsten are mixed.

13. The process as claimed in claim 1, wherein the anion portion of the molybdenum compound is different from the anion portion of the tungsten compound.

14. The process as claimed in claim 13, wherein molybdenum oxide is mixed with an ammoniacal solution of tungsten.

15. The process as claimed in claim 13, wherein tungsten oxide is mixed with an ammoniacal solution of molybdenum.

* * * * *